United States Patent

Varasi et al.

[11] Patent Number: 5,493,390
[45] Date of Patent: Feb. 20, 1996

[54] INTEGRATED OPTICAL INSTRUMENTATION FOR THE DIAGNOSTICS OF PARTS BY EMBEDDED OR SURFACE ATTACHED OPTICAL SENSORS

[75] Inventors: Mauro Varasi; Antonello Vannucci, both of Rome; Mario Signorazzi, Ciampino RM; Pietro Ferraro, Naples; Sabato Inserra Imparato, Gragnano NA; Claudio Voto, Naples, all of Italy; James R. Dunphy, South Glastonbury; Gerald Meltz, Avon, both of Conn.

[73] Assignees: Finmeccanica S.P.A.-Ramo Aziendale Alenia, Rome, Italy; United Technologies Corporation, East-Hartford, Conn.

[21] Appl. No.: 294,874

[22] Filed: Aug. 23, 1994

[30] Foreign Application Priority Data

Sep. 6, 1993 [IT] Italy ................... RM93A0597

[51] Int. Cl.⁶ ................... C01B 11/16
[52] U.S. Cl. ................... 356/32; 250/227.18; 73/800
[58] Field of Search ............ 356/32, 345; 250/227.14, 250/227.18; 385/13; 73/800

[56] References Cited

U.S. PATENT DOCUMENTS

| | | | |
|---|---|---|---|
| 4,761,073 | 8/1988 | Meltz et al. | 356/32 |
| 5,319,435 | 7/1994 | Melle et al. | 356/32 |
| 5,361,130 | 11/1994 | Kersey et al. | 356/345 |

*Primary Examiner*—Richard A. Rosenberger
*Attorney, Agent, or Firm*—Herbert Dubno

[57] ABSTRACT

A system based on integrated optical technologies for the measurement and diagnostics of physical parameters on whatever structure, by the use of optical sensors, made by the fiber embedded Bragg grating method and by the use of a planar integrated optics device for the analysis of the optical signal. The sensors may be embedded or bonded to the structure, allowing the measurement of parameters like strain and temperature, in either a static or dynamic regime. The system pertains to the technical field of the diagnostics and measurements of mechanical or thermal parameters and to the application field of ground, water and aerospace transportation and also to the application field of construction.

9 Claims, 11 Drawing Sheets

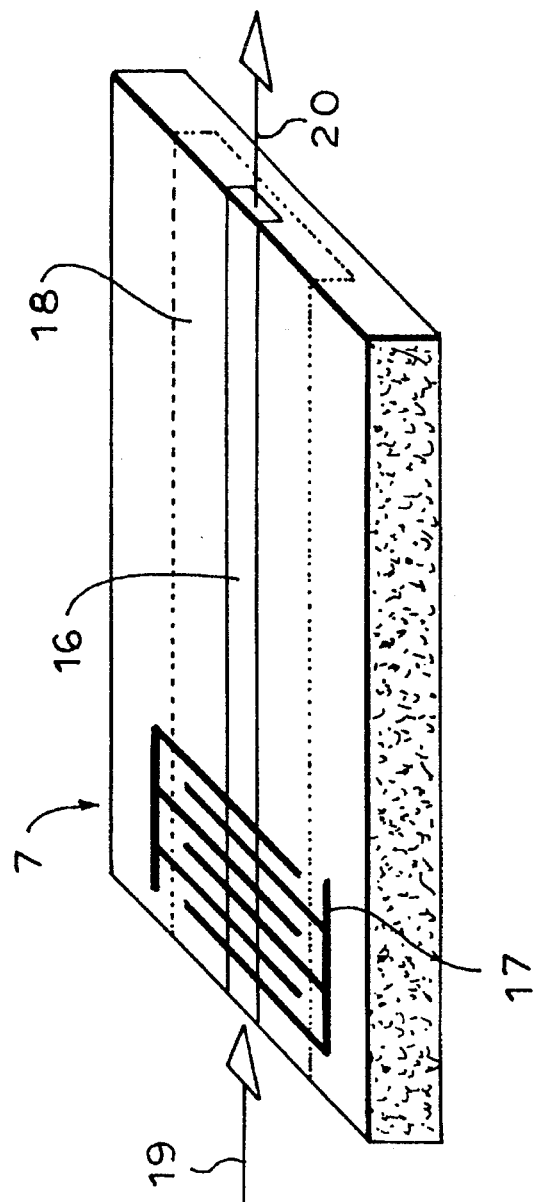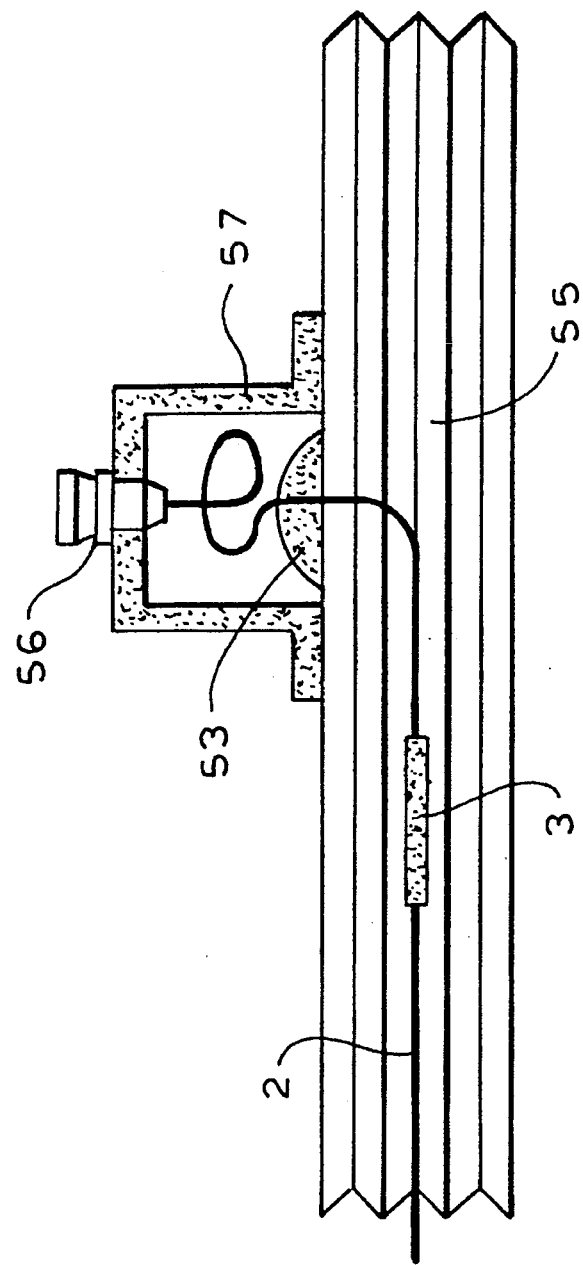

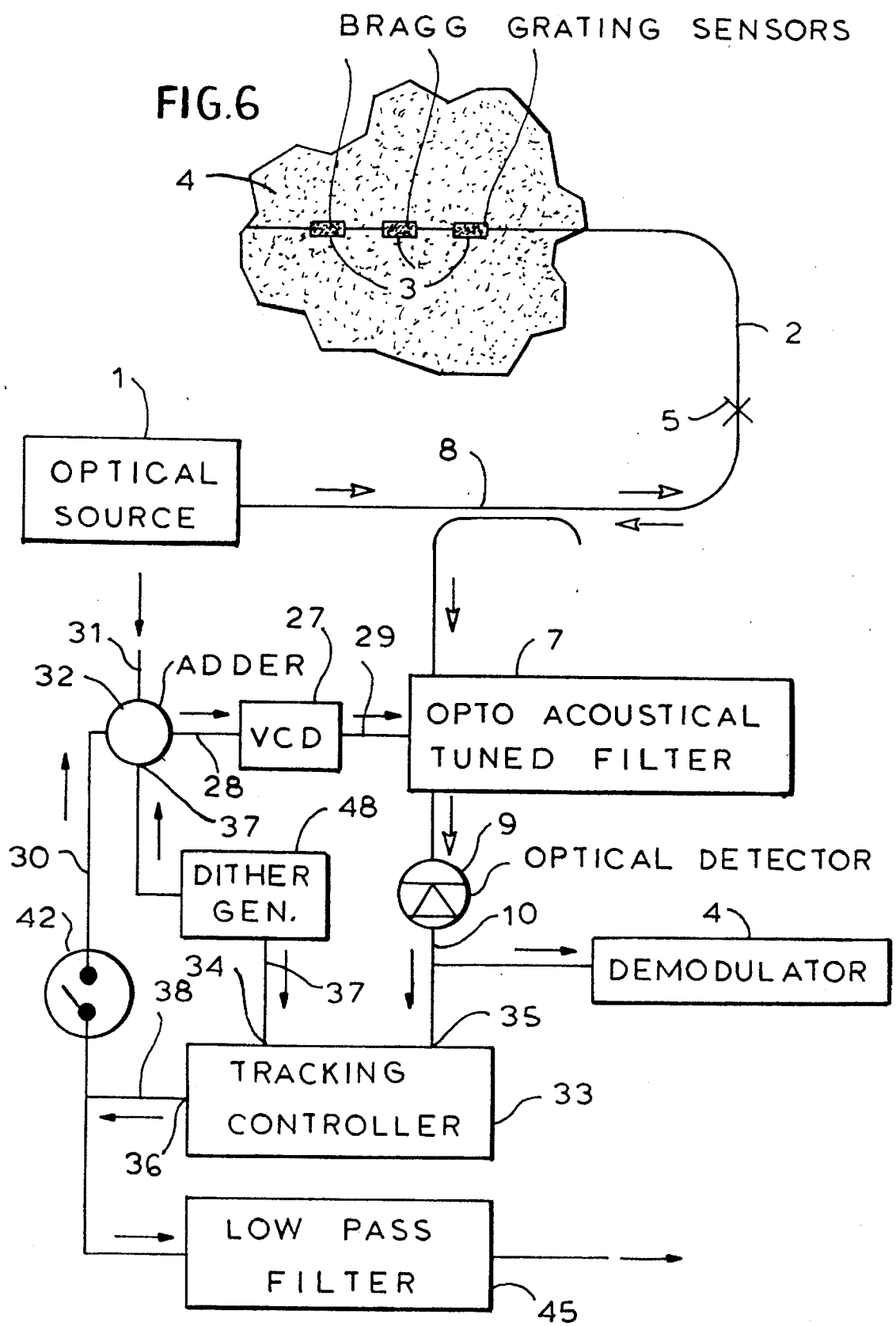

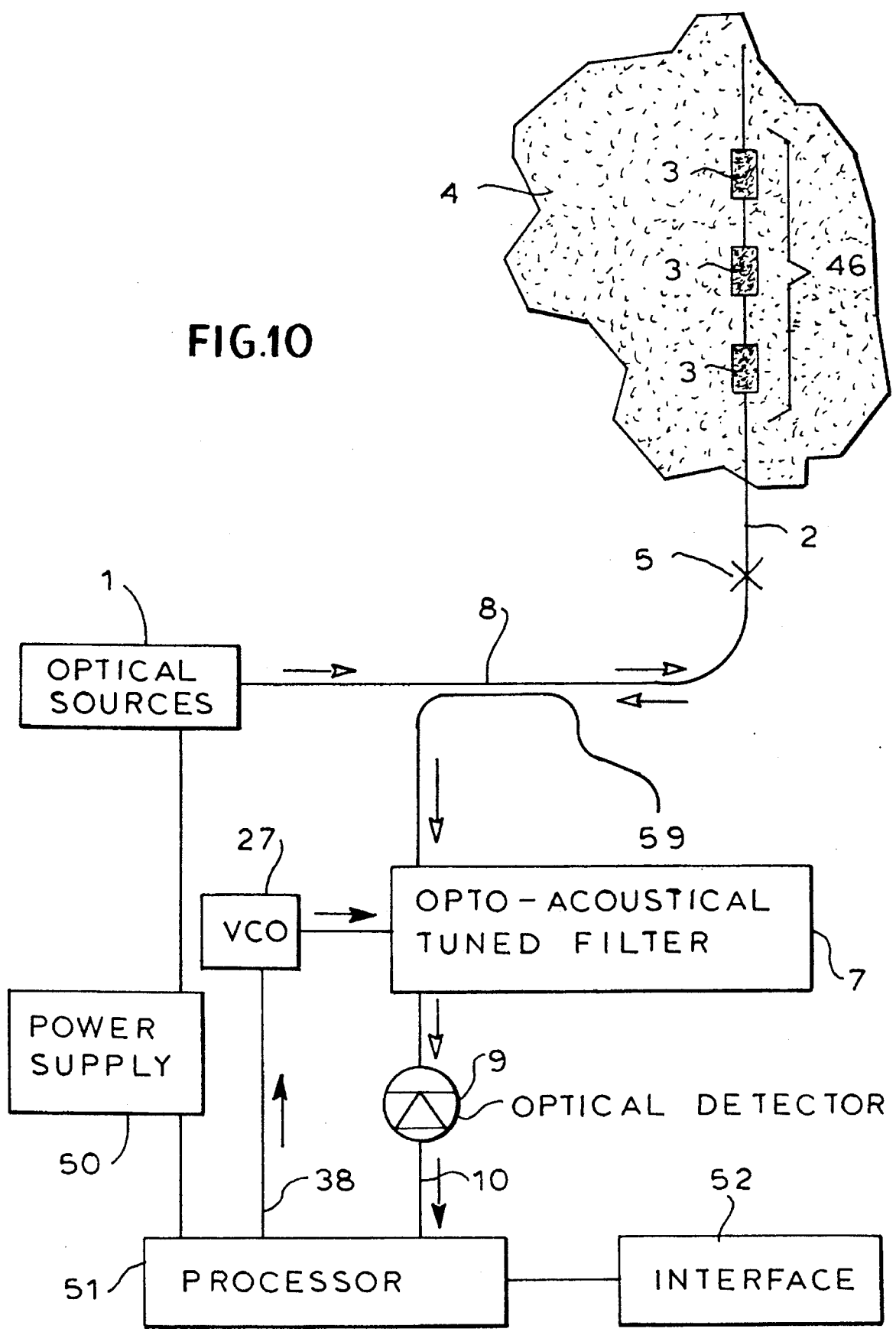

INTEGRATED OPTICAL INSTRUMENTATION FOR THE DIAGNOSTICS OF PARTS BY EMBEDDED OR SURFACE ATTACHED OPTICAL SENSORS

FIELD OF THE INVENTION

The present invention relates to diagnostics and measurement of static and/or dynamic strains and temperature of structures, or in structures of appropriate composition, and of components, or in components of appropriate composition, requiring continuous or periodic monitoring of these parameters.

BACKGROUND OF THE INVENTION

There is a serious need to provide either service monitoring of safety-critical components and structures or to optimize their usage, especially if the structures or components are fabricated of composite materials. This need is particularly critical in the field of structures and components utilized for aerospace, naval and railway applications and in the construction field (e.g. bridges, viaducts, oil ducts, offshore platforms, etc.).

In fact, in these applications, the diagnostics need is paralleled by a requirement for reliable, miniaturized, portable monitoring systems. Optical sensors, either attached to the component surface (the structure) to be monitored or embedded where possible, are particularly suitable for these applications. Each of the indicated applications can benefit from the small, durable, long-lived, electromagnetically-immune capabilities of optical fibers to implement the optical sensing function.

The measurement of the parameters of interest is accomplished by the analysis of an optical signal, travelling within the fiber, that is perturbed in either frequency, or amplitude, or phase, or polarization, because of the interaction between the sensor and the parameter to be measured. Such a fiber sensor can have very small dimensions, can be attached durably or embedded easily in most structures and in most cases can provide a clearly measured representation of the perturbation without itself changing that perturbation.

The utilization of optical sensors is of particular interest in the service diagnostics of fiber reinforced polymers frequently used in the aerospace field. In fact for such structures, the optical sensors may be embedded in the structure during the fabrication process.

In the present state of the art, a method of embedding optical fibers within composite structures has been made available (see ALENIA Italian patent application RM93A000253, filed in Rome on Apr. 22, 1993) that guarantees the structural integrity of the fiber both within the material and at the entrance and exit points.

That application describes a method for embedding optical fibers, or sensors based on optical fibers, into components made of composite materials, with the purpose of performing the diagnostics of mechanical, thermal and chemical parameters inside the component during and after the manufacturing process, and while the component is being used for the purposes for which it has been designed and fabricated.

This method is particularly, but not exclusively, suited for applications to sensors based on optical fibers embedded into composite materials used in aerospace structures fabricated through different processes.

An example of such applications is that of a laminate made of a carbon fiber impregnated with a polymeric matrix, obtained through an autoclave process of compaction and polymerization of different layers, according to an assigned cure cycle of temperature and pressure.

This method may also be applied for systems providing monitoring and control of physical parameters of composite structures, while performing laboratory tests, as well as in service.

The method of that application simplifies and improves the fabrication process of composite structures with embedded optical fibers.

The application of sensors based on optical fibers to the monitoring of composite structures requires the embedding of optical fibers inside the layer of material not yet polymerized. At the end of the fabrication process of a structure made of composite materials, the optical fiber must be connected to the optoelectronic instrumentation to perform the analysis of the optical signals travelling along the fiber. Such signals contain information related to mechanical, chemical and thermal parameters. The optical fiber cannot come out of the composite material component through the external edge of the component, due to the required edge trimming to which the component is subjected. In addition, the method for embedding the optical fiber is simple, easy to be applied during the fabrication process, and able to preserve the integrity of the optical fiber and the quality of the manufactured component.

Any type of optical fiber can be used with this method. Optical fibers have a good mechanical strength under tension or compression loads, but they show a certain degree of brittleness when they undergo bending, if the radius of curvature is small. If the optical fiber comes out of the component without any special provision, it is highly probable that the fiber will be broken at the points of entrance and exit.

The method described in the aforementioned application has proved to be effective in the fabrication of components made of composite materials.

Embedding a sensor based on optical fibers into a component made of polymeric-matrix composites is performed by placing the optical fiber between contiguous layers of reinforcing materials. The component then undergoes the polymerization process through a temperature and pressure cycle, as required by the polymeric matrix.

The optical fiber is placed in such a way as to go into and come out from the component, in order to be connected with the instruments which generate and analyze the optical signals travelling along the fiber. In the present state of the art, the entrance and exit of the optical fiber are at a free end of the fiber emerging from the edge of the component.

The method protects an optical fiber embedded into a component made of composite materials, at the points where the optical fiber goes into and cones out of the component, by means of a small disk of rubber bonded on the surface of the component. This method also uses supports attached to a structure made of such components, for the purposes of protecting, after the embedding phase, the parts of the Optical fiber which are external to the structure, and for linking connectors with the optical fiber.

This method allows the optical fiber to go into and come out of the composite material component through the surface of the component instead of through the perimetral edge, thus obviating the difficulties related to the trimming of the component with the optical fibers embedded therein.

The method also ensures that the optical fiber will have high strength at the entrance and exit points, which are placed at the surface of the component, as the rubber disk results in an elastic constraint for the optical fiber at the entrance and exit points, and effectively protects the portions of optical fiber which are external to the component and to the end connectors.

Furthermore the operations, which are required to finish the component, can be performed easily, while maintaining the integrity of the optical fiber.

According to the invention, the layers of pre-impregnated material are cut as specified in the design drawings and the layers are then placed and compacted to form two pre-plied layers of pre-preg. Rubber disks are placed on the surface, one disk at each of the entrance and exit points of the optical fiber. Then a layer of release film is applied on the surface and the whole is compacted by using a temporary vacuum bag.

The upper pre-plied layer is then perforated, where the rubber disks have been placed, by means of hypodermic needles, which needles are left in their positions. The optical fiber is inserted through the needles, the needles are extracted and the optical fiber is tightened.

After fixing of the ends of the optical fiber to the release film, the upper pre-plied layer is placed on the lower pre-plied layer and two pre-plied layers are compacted by using a temporary vacuum bag.

The final vacuum bag is prepared by placing the release film, the breathing weave and a bagging film on the final stack resulting from the upper pre-ply compacted with the lower pre-ply layer and the bagging film is sealed on the tool by means of a sealant. A vacuum valve is placed on the vacuum bag, and air is drawn from the bag.

The assembly resulting from the operations indicated above is placed in an autoclave or oven or the like, and the requisite polymerization pressure and temperature are applied. The vacuum bag is then opened and the component is trimmed along its edges.

Protection elements are placed on the rubber disks, connectors are fitted at the ends of the optical fiber and the connectors are secured in their locations on the protection elements.

To date, several kinds of optical sensors for different applications (e.g. measurement of temperatures, strains) have been developed, based on different mechanisms of interaction between the parameter to be measured and the sensor (E Udd, Springer Proceedings in Physics Vol. 44, "Optical fiber sensors", Paris, France, Sep. 18–20 1989, pages 392–399). One sensor type of particular interest, the fiber grating sensor, was developed to operate in a Bragg system (Meltz, et al. Distributed, Spatially Resolving Optical Fiber Strain Gauge, "U.S. Pat. Nos. 4,761,073 and 4,806,012 of Aug. 2 1988 and Feb. 21 1989).

The grating is permanently exposed in the central core waveguide of the optical fiber through a process causing a periodic spatial modulation in the index of refraction along the longitudinal axis of the fiber. This grating constitutes an optical filter for the light radiation entering the fiber.

The light in the passband of the fiber grating filter is reflected back toward the optical transmitter during the preferred implementation. The intensity of the modulation of the index of refraction in the grating and the very same length of the grating determine the characteristics of the optical filter in terms of efficiency of reflection and bandwidth, while the grating pitch fixes the position of the filtering passband in the band of wavelengths. As an example, we consider the case of a Bragg grating sensor, embedded in the structure, that is illuminated by a wideband optical radiation. Mechanical deformations of the structure such as an elongation or a contraction cause a variation of the grating pitch and average index of refraction and, consequently, a shift in the filter function of the optical grating filter. This means that the signal that is reflected by the sensor is shifted in wavelength. This shift is, typically, a linear function of the variation of the grating pitch determined by the structure strains in the location of the sensor, in accordance with the relation (W. W. Morey, G. Meltz and W. H. Glenn, Springer Proceedings in Physics, Vol. 44, "Optical Fiber Sensors", Paris, France, Sep.18–20, 1989, pages 526–531):

$$\Delta\lambda_B/\lambda_B = (1-Pe)\epsilon$$

where $\lambda_B = 2n\Lambda$ is the central wavelength band of the optical signal reflected by the grating (n is the index of refraction for the propagation in the optical fiber and $\Lambda$ is the grating pitch), and $\Delta\lambda_B$ its variation, Pe is the photoelastic constant of the optical fiber and $\epsilon$ is the value of the longitudinal strains, measured in microstrain. The above expression assumes that the sensor is perfectly integrated with the structure and is capable of following its deformations. This enables the Bragg grating sensor to measure the structure strains at the location of the sensor.

The necessary measurement (required to be performed on the light in order to convert the changes of the affected sensor into strain or temperature changes) is the shift $\Delta\lambda_B$ of the Bragg filter wavelength before, during and after the perturbation. When the wavelength shift measurement is accomplished with conventional laboratory instrumentation, some unavoidable limitations in terms of heavy transportation weight, large instrument dimensions, long instrument measurement times can inhibit the ability to conduct such measurements in the field of service or at remote locations.

Quite recently, opto-acoustic devices have been made available in an integrated optics format (see ALENIA Italian Patent Application RM 93A000422 filed in Rome on Jun. 25, 1993) that are capable of operating as tunable optical filters.

That application describes an opto-acoustic device with a narrow wavelength bandwidth for filtering of guided optical radiation propagating along an optical fiber, such a device being rapidly tunable in a large bandwidth, insensitive to the polarization state of the optical radiation, without moving parts, robust and small in dimensions (<5cm³). The device consists of a planar optical circuit, integrated on the surface of a lithium niobate (LiNbO₃) substrate in which, separately for each input optical polarization, co-linear acousto-optic interactions with Surface Acoustic Waves (SAW) of suitable frequency are exploited to obtain polarization conversions, and a polarization filtering system is used in order to obtain a monotone correlation between the SAW frequency and the central optical wavelength of a narrow bandwidth implementing the optical transmission function of the device.

The combination of different technologies for the fabrication of the planar optical circuit, i.e. Titanium diffusion and protonic exchange followed by a thermal annealing, allows the integration of original key components, polarization splitters and combiners and the polarization filters, that are necessary to the architecture of the circuit to allow the device to be insensitive to the polarization of the optical radiation that has to be analyzed.

Furthermore the acoustic waveguides, that are integrated with the optical circuit, allow optimization of the device efficiency and increase its maximum resolution.

The invention in that application can be classified in the technical field of planar optical devices realized in integrated configuration to be interfaced with optical fibers, and in the application fields of: (a) optical fiber sensors, as a tunable filter for the spectral analysis of the optical radiation propagating along the fiber, or as a discriminator to measure the variation of the spectral optical line vs. time; and (b) communications through optical fiber networks operating on multiple optical carriers, for carrier multiplexing or demultiplexing.

In particular the new device there described for the narrow bandwidth ($\delta\lambda/\lambda > 10^{-4}$ to $10^{-5}$) filtering of optical radiations guided along an optical fiber can quickly be tuned in a large bandwidth (($\lambda_{max} - \lambda_{min})/\lambda \approx 0.2$ to $0.3$), and can also operate in a large optical wavelength range (500 to 2500 nm). It is insensitive to the polarization of the optical radiation, without moving parts and small in dimensions.

The device is realized on a substrate of lithium niobate (LiNbO$_3$), cut orthogonally to the "X" axis of the crystal, in which two monomode optical waveguides are formed by titanium diffusion at high temperature. Two monomode optical waveguides, formed by proton exchange followed by thermal annealing, are both coupled at the ends of the titanium diffusion waveguides. The annealing step is used to have a refraction index profile for TE polarization similar to the index profile obtained by the titanium diffusion process. The input and the output of the optical signal correspond to the end faces of the titanium diffused waveguides. Parts of the waveguides realized by means of the proton exchange process, are close to the waveguides in proximity of their end faces, for a length and with a separation allowing the complete coupling between the two waveguides for the TE polarization.

In the length of the titanium diffusion waveguides between the coupling zones with the proton exchange waveguides and the points, where the superposition begins between the acoustical waveguides and the optical waveguides, titanium diffusion waveguides have at their sides, for a length of a few millimeters, two regions where a process similar to that used for the fabrication of the proton exchange guides has been effected, in order to obtain a stop filtering aimed at suppressing the residual TE component of the optical radiation.

Along the two parts in which the acousto-optic interaction occurs titanium diffusion guides are parallel to the "Y" axis of the LiNbO$_3$ crystal, and guides are delimited by regions, where acoustic speed is higher than inside the acoustical waveguides. The increase in acoustic speed is obtained by a deep diffusion at a high temperature of an amount of titanium which is twice as high as that used to fabricate the optical waveguides. Two identical SAW transducers are formed at the ends of each of the two acoustical waveguides. The device is completed by two acoustic absorbers at the ends of the two acoustic waveguides.

The optical circuit of this device includes two kinds of waveguides: titanium diffused waveguides capable of propagating both TE and TM modes, and post annealed proton exchange waveguides capable of guiding only TE mode.

Two passive directional couplers are provided between the titanium waveguides and the proton exchange waveguides, so that TE radiation can be coupled from the first type to the second type and vice-versa, while TM mode propagates undisturbed into titanium diffused waveguides. In this way a polarization splitter is fabricated, Which does not require control voltage. Furthermore, the mixed technology permits in the same process step the fabrication of the hybrid directional coupler mentioned above and of the polarization filtering components at the input and output of the interaction regions. In fact, for the optimal operation of the device with respect to sensitivity, the polarization mode at the input of the interaction regions must be as pure as possible, and the residual input polarization mode at the output that has not been transformed by the acousto-optic interaction must be completely cancelled. These filtering functions are implemented by the transitions between titanium diffusion and proton exchange guides for TE and by the regions surrounding the titanium diffusion guides.

The two acousto-optical interactions exploited in the device occur in the central part. These two co-linear interactions, between the two polarized optical waves and the surface acoustical waves, produce the energy exchange between the two polarization state of the optical radiation. As previously described, the acousto-optical interaction occurs when the sum of the wave vectors of the input photon and phonon is equal to the wave vector of the output photon. Two different acoustic-optic coupling regions are included in the device because of the two different polarizations of the input optical wave. The following operations on the optical radiation are necessary for a correct working of the device:

the TE and TM components of the input optical radiation must be separated and sent to the corresponding interaction regions by a polarization beam splitter;

the polarization of the optical waves at the input and output of the interaction regions must be correctly filtered, in order to have the TE (or TM) polarized radiation filtered at the output of the interaction region, at the input of which the TM (or TE) polarized radiation is sent by the polarization beam splitter; and the optical output of the interaction regions must be combined into the optical output of the device by a beam combiner.

By so doing, the transfer function $I(\Delta\lambda)$ is the transmission function of the filter. The input and output parts of the device provide the separation, recombination and filtering of optical polarizations. In the input part the two polarizations are separated, filtered and sent to the inputs of the corresponding interaction regions included in the central part of the device. The TM-polarized radiation enters the first titanium diffusion waveguide in the interaction region, at the output of which a SAW transducer is placed, in order to launch the SAW in the opposite direction with respect to the propagation of the TM-polarized optical wave. The TE polarized radiation enters the second proton exchange waveguide in the interaction region at the input of which the other SAW transducer is placed, in order to launch the SAW in the same direction as the propagation of the TE-polarized optical wave. This separation of the two polarizations allows the device to be independent of the polarization of the incoming optical radiation. As previously described, the optical wave and the acoustical wave propagate coaxially through the interaction regions. The increase in the SAW propagation speed in the two surface areas surrounding an unperturbed LiNbO$_3$ channel allows the fabrication of the acoustical waveguide. The SAW propagation speed increases at the deep diffusion of titanium, the amount of which is roughly twice as high as that which is necessary for fabricating the optical waveguide.

The acoustical waveguides eliminate the diffraction loss of the SAW, with consequent increase in the efficiency of the device and in the acousto-optical interaction length. An increased length for acousto-optic interaction results, in turn, in narrower filter resolution. The two acoustical absorbers are used to eliminate SAW reflections at the edge of the device.

Such devices can be used to measure the shift of the reflected wavelengths of light from the fiber Bragg grating sensor or analyzing the associated transmitted signal. In a word, the integrated optics version of the acoustic-tuned filter is capable of performing the same functions as the laboratory instrumentation while overcoming the limitations of weight, size and measurement speed.

In fact, the integrated optics spectrometer has very small dimensions (<5cm³), and its weight is mainly due to packaging materials that provide significantly reduced volume in comparison with laboratory instruments. Its performance is less affected than similar laboratory instruments by the effects of environmental conditions in which a structure of interest operates, e.g. vibrations, temperature changes, acceleration, electromagnetic interferences, etc. As such, it is operable outside a laboratory and is capable of analyzing the spectrum of the reflected signal with a very rapid response and with a resolution that can be implemented from 0.5 to 5 nm. Further, it requires much less electrical power (<10mW) compared with 10's of watts that laboratory instruments require.

OBJECTS OF THE INVENTION

It is the principal object of the present invention to provide an improved instrument capable of being used selectively in a plurality of modes utilizing principles described above.

Another object of the invention is to provide a compact accurate optical instrument capable of being used selectively as a spectrometer, a wavelength discriminator and a spectra peak tracker.

SUMMARY OF THE INVENTION

These objects are attained, in accordance with the invention, in an optical system comprising:

an optical fiber attached to a structure;

light source means for providing a broadband source light, the source light being launched into the fiber;

at least one fiber sensor formed within the optical fiber, the sensor providing reflected light substantially at a reflection wavelength and providing transmitted light at a transmission wavelength other than the reflection wavelength, the reflection wavelength varying in response to a perturbation of the structure near where the sensor is attached;

integrated tunable opto-acoustic filter means located in the path of output light from the sensor, for filtering the output light received from the sensor, the passband of the filter means being adjustable to overlap with the reflection wavelength of the sensor in response to a filter control signal, and for providing an optically filtered signal having a power related to the optical transmission of the filter at the reflection wavelength of the sensor;

optical detection means, for detecting the power of the optically filtered signal from the opto-acoustic filter means and for providing a detection signal indicative thereof; and signal processing means responsive to the detection signal, for providing the filter control signal, for detecting a shift in the reflection wavelength due to the perturbation, and for providing a signal indicative of the perturbation.

The possibility of measuring the mechanical and thermal state of composite structures and components with embedded optical fiber sensors has already been demonstrated, but by using cumbersome laboratory instrumentation. Laboratory instrumentation based on spectrum analyzers and optical components such as interference filters have been used to measure the shift of the reflected average wavelength signal and consequently extract one of the key optical parameters to monitor. In many cases these methods are not compatible with the needs for remote or mobile service monitoring of strain and temperature using fiber grating sensors on or in structures and components. Besides, analyzing the spectrum of the optical signal transmitted or reflected by the sensor with a high resolution (0.1–0.5 nm) requires a long time for each measurement (a few seconds) by laboratory instrument methods. This response time is not compatible with the need for real time monitoring. Much remote or mobile service monitoring requires the speedy and automatic measurement of static and dynamic strains and temperature.

One result of this invention is to make available a complete compact and integrated system suitable for the real time monitoring of service strains on structures and components, with miniature characteristics and compatibility with the environmental conditions in which the structure or the component may operate. This is accomplished by using the opto-acoustic tuned filter device in integrated optics form as described by RM93A000422. This device can alleviate the limitations of laboratory systems.

This invention utilizes the opto-acoustic tuned filter in, at least, three different operating modes, exhibits a modular architecture, and can measure static and dynamic strains (vibrations) either jointly or separately.

In particular cases of aeronautical applications, the invention described here is suitable for the development of smart structures technology, for its characteristics of reduced instrumentation volume and weight, for its portability, for its utilization versatility in terms of measuring static and dynamic strains, jointly or separately, without any need for reconfiguration of the system architecture Another beneficial feature of the invention is the definition of a modular architecture that makes the invention more apt to be industrialized or commercialized than previous experimental demonstrations operating in a laboratory.

This invention is appropriate for application in the fields associated with smart structures development. As an example, the invention is applicable to the in-service monitoring of structures and components in the aerospace, railway, water and construction fields.

In addition, the invention can be used to monitor the changes in internal strain state and temperature of a composite structure as it is consolidated during any number of composite fabrication techniques. Examples of such applicable consolidation methods are autoclave curing, closed-mold curing, resin transfer molding or resin injection molding.

BRIEF DESCRIPTION OF THE DRAWING

The above and other objects, features, and advantages will become more readily apparent from the following description, reference being made to the accompanying drawing in which:

FIG. 3 is a diagrammatic perspective view of the opto-acoustic tuned filter, in accordance with the present invention;

FIG. 6 is a schematic block diagram of an embodiment of the optical diagnostics instrument for use in a closed loop tracking mode providing simultaneous static and dynamic perturbation measurement and open loop wavelength discriminator mode, in accordance with the present invention;

FIG. 10 is a schematic block diagram of an optical diagnostics instrument configured to be integrated with a monitoring diagnostic system, in accordance with the present invention;

FIG. 11 is a side view broken away of an optical fiber and fiber sensor embedded in a composite structure, in accordance with the present invention.

SPECIFIC DESCRIPTION

Figure 1:
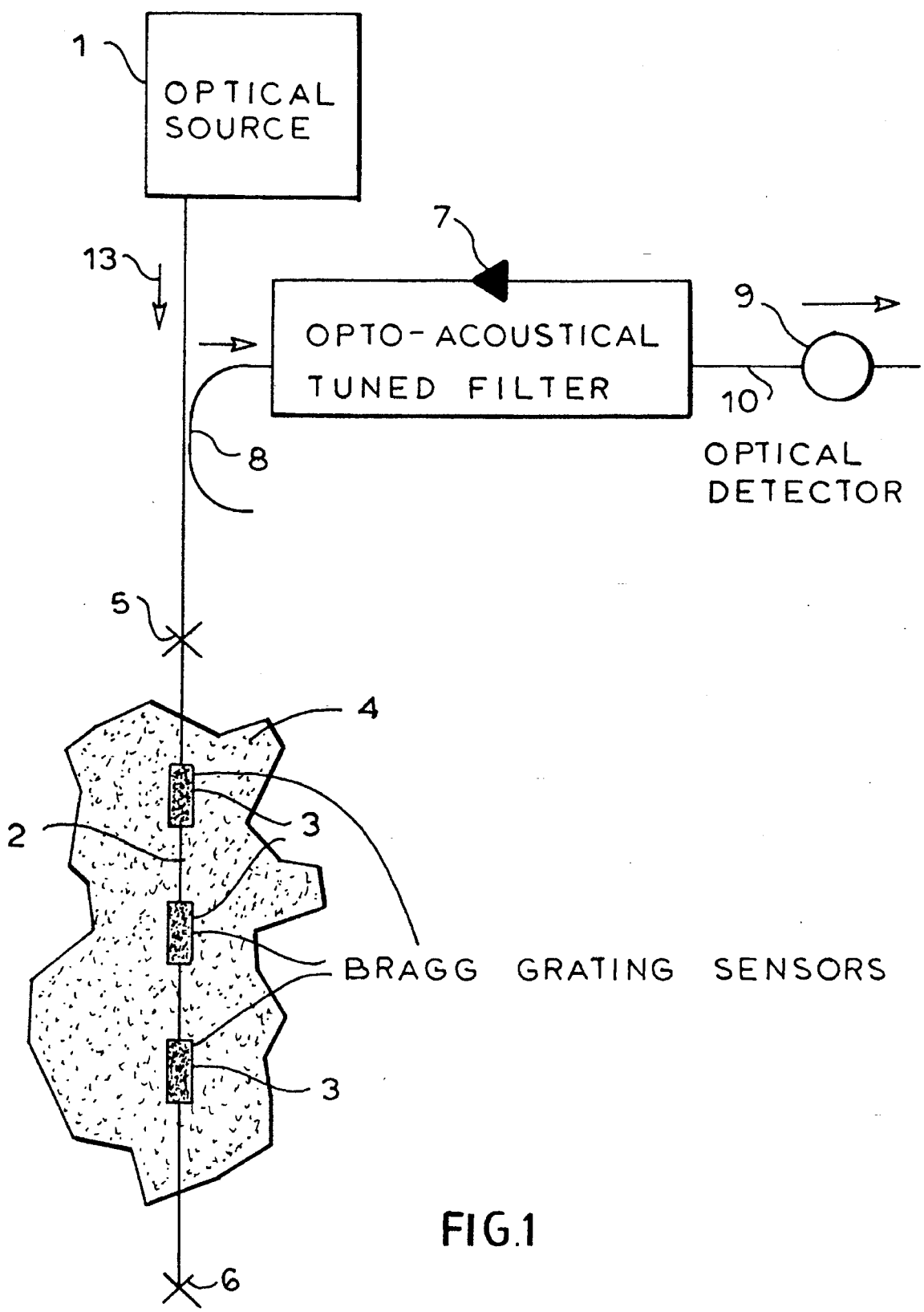
FIG. 1 is a block diagram of a basic module of an optical diagnostics instrument showing a single string of sensors illuminated by a broadband light source with reflected signals analyzed by an opto-acoustic tuned filter, in accordance with the present invention.

In FIG. 1, we show an apparatus or instrument according to the invention which comprises basically an optical source 1 connected to an optical fiber 2 having a primary entry and exit point of the optical fiber from a structure 4 provided with the optical fiber connector and the linkage with the optical source 1 and the analysis instrumentation.

The optical fiber 2 is mounted on or incorporated in the structure 4 and has integrated into it Bragg grating sensors 3 which are embedded with the fiber in the structure 4 or are bonded with the fiber 2 to the structure 4. An opposite end 6 of the fiber 2 can be provided with a connector for the linkage with the optical source and analysis instrumentation as a redundant entry/exit point of the optical fiber.

The analysis instrumentation can include a two-by-two optical fiber coupler 8, an output of which is connected to the optical detector 9 by an opto-acoustical integrated optics tuned filter 7 of the type previously described. The electrical signal 10 is the output from the optical detector.

Figure 2A:
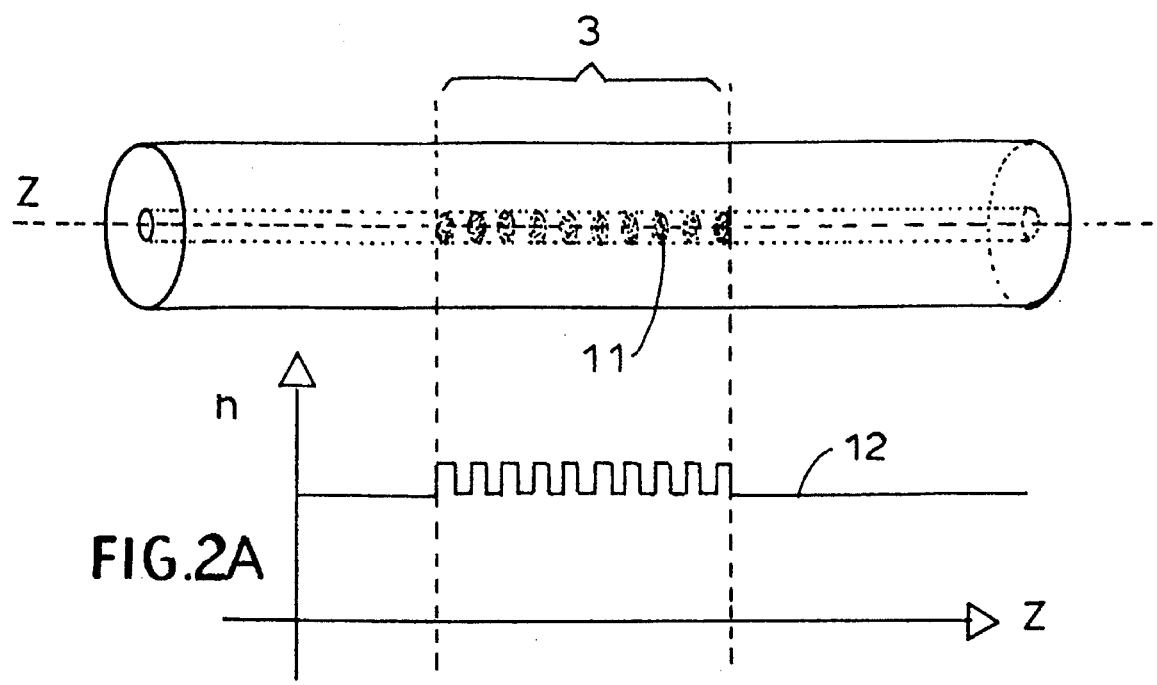
FIG. 2A is a diagram showing side view of an optical fiber with a periodic array of refractive index perturbations in the fiber core, and a graph of the corresponding magnitude and distribution of the index perturbations, in accordance with the present invention.
Figure 2B:
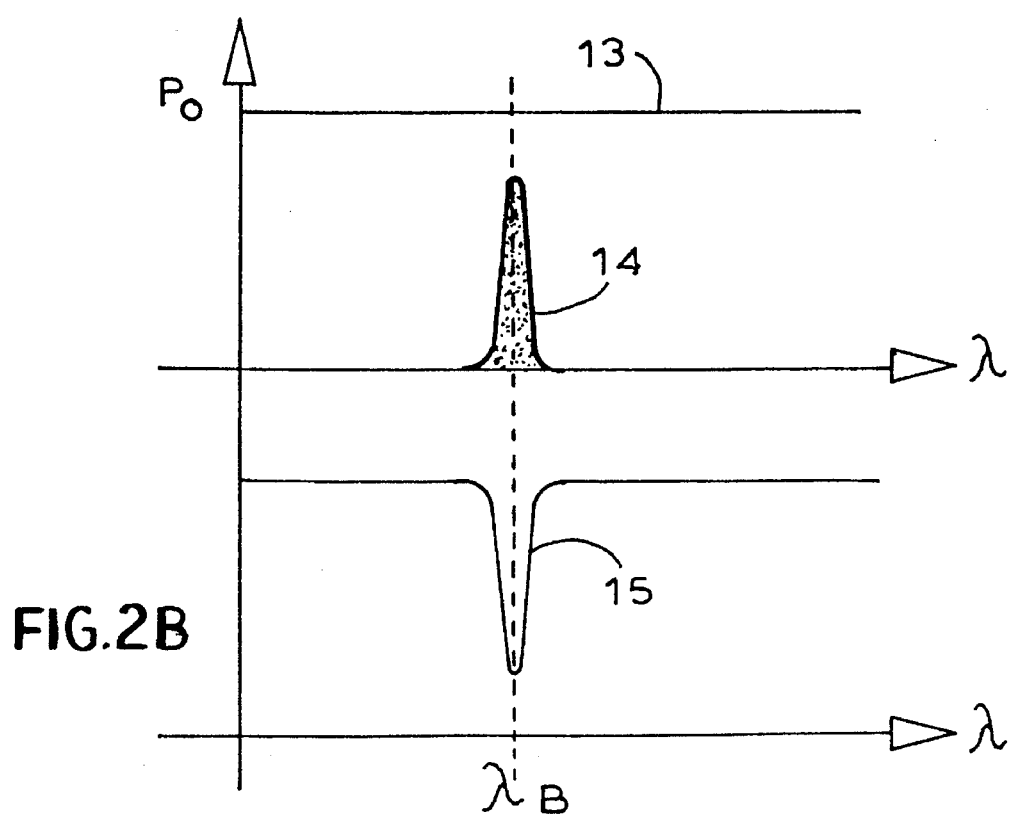
FIG. 2B comprises graphs of the optical reflection and transmission profile of grating in accordance with the present invention.

In FIGS. 2A and 2B, we have shown the Bragg grating 11 within the fiber 2 in conjunction with the variation of the index of refraction 12 of the waveguide in the propagation direction in the graph of FIG. 2A in which the index of refraction n is plotted along the ordinate against a distance therealong the abscissa representing the propagation direction. The graph of FIG. 2B represents power plotted along the ordinate against a wavelength plotted along the abscissa and shows at 13 the distribution of the optical signal power spectrum driven into the fiber before the interaction with the grating, at 14 the optical signal power spectrum reflected by the grating and at 15 the optical signal power spectrum transmitted by the grating.

As can be understood from FIGS. 1, 2A, and 2B, the invention consists of a system for the measurement and diagnostics of the strains and temperatures. It is made up of individual modules that can be configured into different and expandable architectures, depending on the scope of diagnostics and number of sensors required by any specific application.

The source 1 transmits a wideband optical signal 13 into the fiber 2. This signal interacts with the Bragg grating 11 inside the sensor 3 and both a reflected signal 14 and a transmitted signal 15 are generated. This happens since the Bragg grating 11 acts like a filter that transmits undisturbed all the components of the incoming optical signal with the exception of a narrow band of wavelengths, whose center satisfies the Bragg relation:

$$\lambda_B = 2n\Lambda$$

The optical signal reflected from the Bragg grating sensors 3 is shifted in the optical spectrum as a result of the strains in the structure 4 at the location of the sensors. The radiation belonging to such a band is reflected by the grating 11 and is collected by the coupler 8 and is sent partially to the opto-acoustical analyzer that processes the radiation, acting like a tunable optical filter.

In FIG. 3, we have shown in greater detail the opto-acoustical tuned filter device 7 with the integrated optics.

This device comprises an optical substrate formed with a channel optical waveguide 16 along which an acoustical wave transducer 17 is provided to define an acoustic waveguide 18 superimposed over the optical waveguide 16. The filter device has an optical radiation input at 19 and an optical radiation output at 20.

Referring to FIG. 3, the function of the analyzer 7 is accomplished utilizing a circuit in planar integrated optics created in $LiNbO_3$ as has been described previously in general terms. This circuit exploits a collinear interaction between the optical radiation that is travelling in the optical waveguide 16 suitably interfaced with the fiber 2 (FIG. 1) at the input (19), and a superposed counter propagating acoustical wave launched into the acoustic waveguide 18 by the transducer 17 that propagates in the acoustic waveguide 18. It is important to note that the optical and acoustic waveguides are coaxial in order to optimize the efficiency of the interaction.

The interaction causes the transfer of optical power between the two waveguide polarizations, once the following relationship is satisfied:

$$\lambda_p = V_{ac}(n_{TM} - n_{TE})/f$$

where $\lambda_p$ is the peak wavelength in which the interaction has the maximum efficiency, $n_{TM}$ and $n_{TE}$ are the indexes of refraction of the two guided polarizations TM and TE, and f is the frequency of the signal exciting the superposed acoustical waves.

In the optical circuit that constitutes the analyzer 7, the region of interaction is limited by two complementary polarizers, set at the input 19 and at the output 20, that allow the whole system to be transmitting only when the above relationship is true.

The analyzer 7 utilizes two simple circuit elements as previously described, that operate on the two polarizations separated and channeled appropriately, to make the whole device independent of the polarization of the optical radiation introduced at the input. The same function is obtained utilizing two simple opto-acoustical devices that separately operate on the two different polarizations, separated as well by a third element operating in the fiber. The frequency of the generated acoustical waves may be varied continuously over a wide interval. Consequently the central wavelength of the analyzer 7 may be modified rapidly within a wide region of wavelengths ($\Delta\lambda/\lambda \leq 0.4$).

Depending on the type of application, the module described above may operate in three different ways (or modes):

(1) as a spectrometer;

(2) as a wavelength discriminator;

(3) as a spectral peak tracker.

The three modes are now described.

Figure 4A:
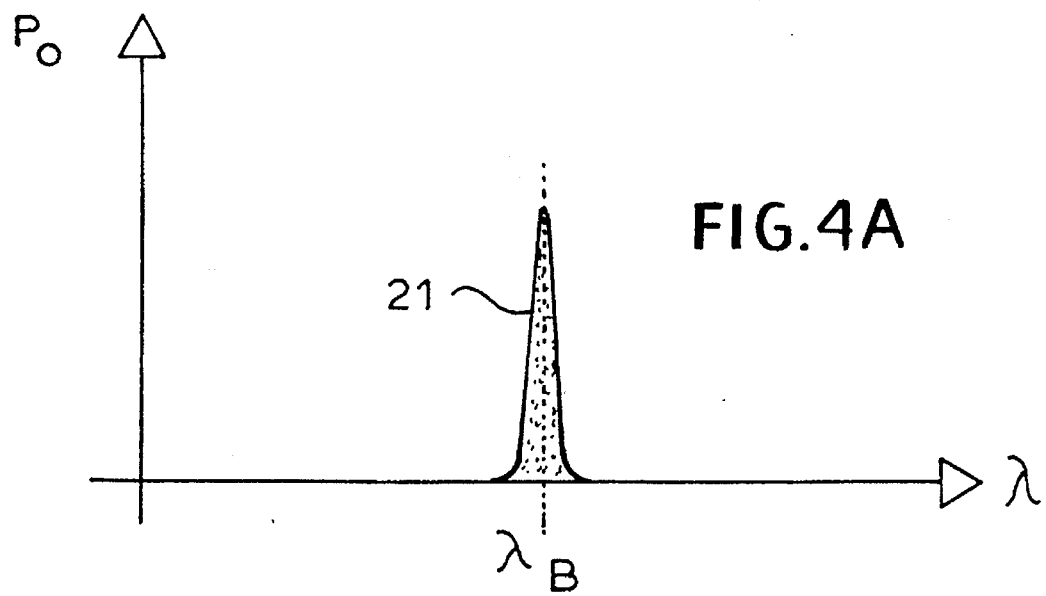
FIGS. 4A, 4B and 4C are graphs showing the grating reflectivity profile, the opto-acoustic tuned filter function, and the output signal resulting from sweeping the opto-acoustic tuned filter across the grating profile, when the instrument is configured in a spectrometer mode, in accordance with the present invention.
Figure 4B:
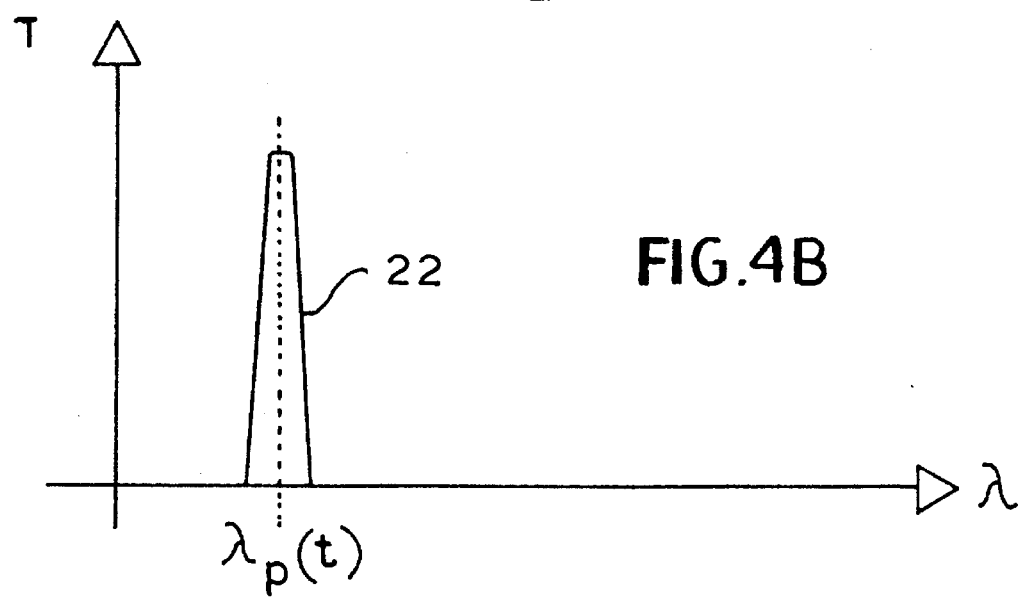
Figure 4C:
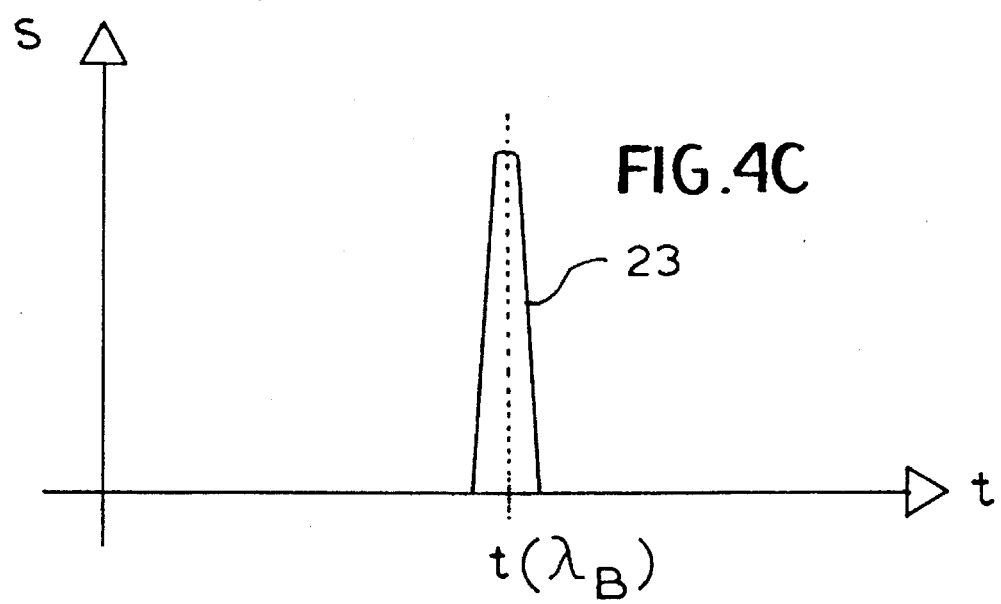

Referring to FIGS. 4A, 4B and 4C, in the first operating mode as a spectrometer, the analyzer 7 measures instantaneously the wavelength corresponding to the center of the reflected optical signal 14 from each fiber Bragg grating sensor 3. The transmission function 22 of the filter is tuned in a repetitive fashion over all of the region of optical wavelengths of interest in which the reflection of the grating 21 is contained. The variation of the wavelength of the tunable optical filter function is correlated to the variation of the frequency of the signal that generates the superposed acoustic field. Consequently, at instant 23 when the scanned filter function coincides with the reflected optical signal from the remote fiber grating sensor 3, optical detector 9 responds with the largest electrical response and thereby uniquely identifying the wavelength of the optical signal reflected by the sensor 3.

This operating mode is clearly useful as a scanning spectrometer for measuring the static strains applied to the fiber grating sensors. This operating mode also allows for the detection of periodic strains applied to the sensor 3 as long as the frequencies of change imposed on the sensor satisfy the Nyquist sampling rate criterion determined by the scanned opto-acoustic filter of the analyzer 7. The Nyquest condition may limit the detectable bandwidth of dynamic strain signals during this mode of operation. Hence the system can be operated in a second useful mode to increase the allowed bandwidth for detection of high frequency dynamic strains.

Figure 5A:
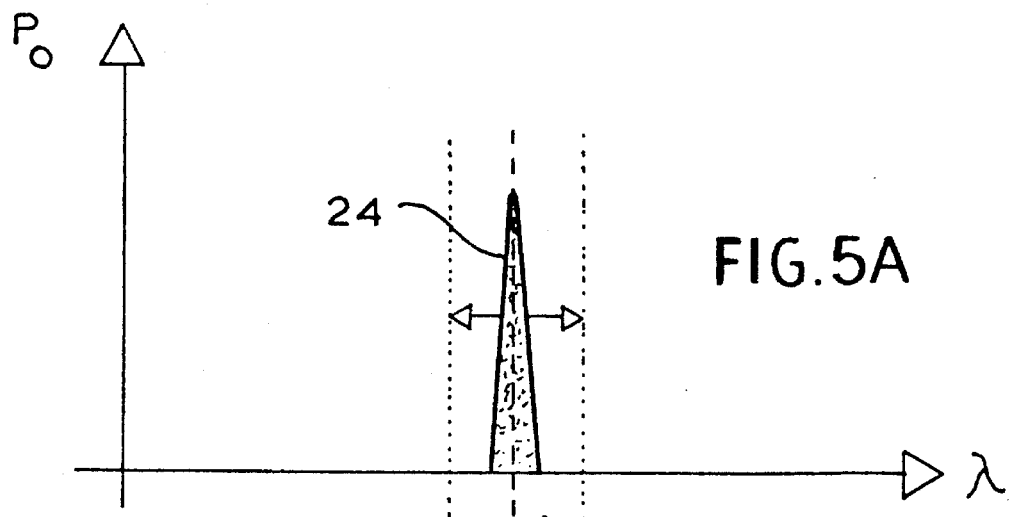
FIGS. 5A, 5B and 5C are graphs showing the grating reflectivity profile, the opto-acoustic tuned filter function, and the filter output signal resulting from variations of the grating profile, when the invention is configured as a wavelength discriminator, in accordance with the present invention.
Figure 5B:
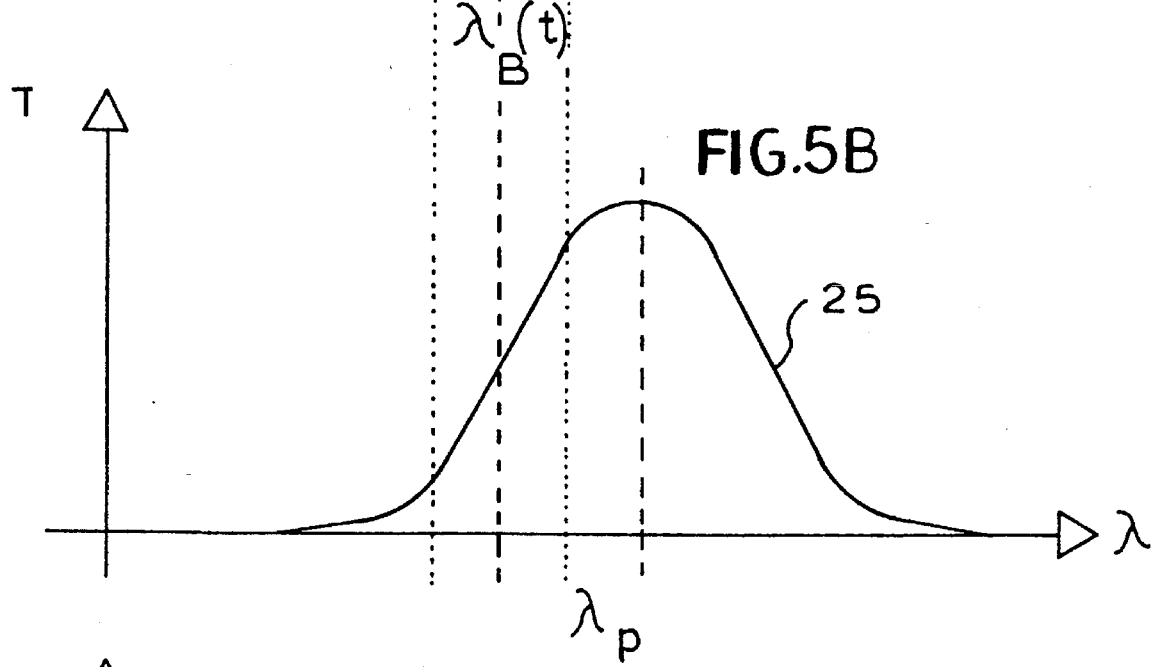
Figure 5C:
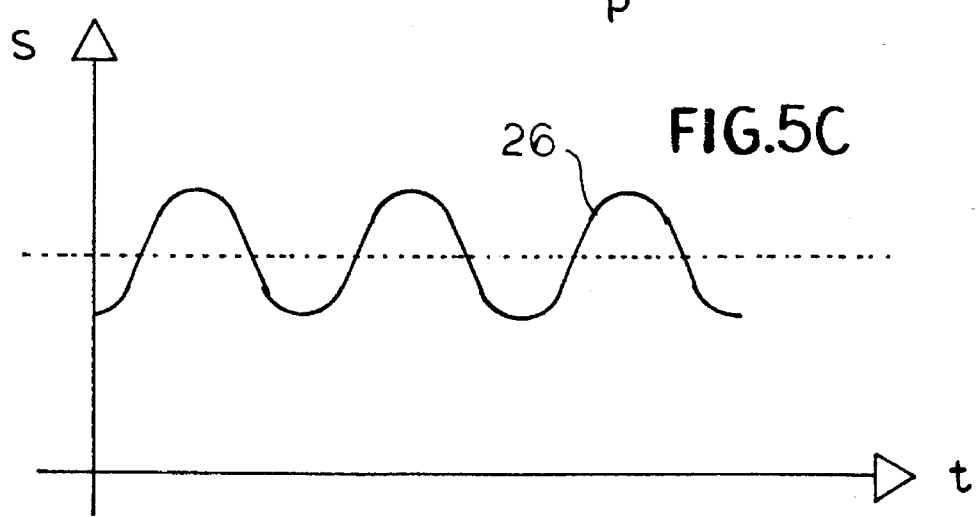

During the second mode of operation summarized in FIGS. 5A, 5B and 5C the opto-acoustic filter is tuned such that sensor signal 24 is generally positioned on the linear portion of the slope of the filter function 25. The opto-acoustic filter is temporarily held in this position, that means that the center wavelength $\lambda_p$ of the filter transmission function 25 is fixed at center of the slope. During this short dwell time, the high speed dynamic changes imposed on the fiber grating sensors 3 can be decoded.

In this manner, dynamic strains with very high frequency content can be measured with very high resolution. At the end of an appropriate dwell time, the opto-acoustic filter can be turned to decode high speed strains on other sensor signals that are within its tuning range.

The previously described operating modes are generally optimum for either static strains (first mode of operation) or for dynamic strains (second mode of operation). In some applications, both static and dynamic strains are required while a fiber grating sensor 3 is subjected to large wavelength excursions from large static temperature changes and/or from large static load changes. In such a case, a third mode of operation may be beneficial.

The third operating mode configures the opto-acoustic filter with a tracking controller 33 so that the tunable filter 6 can be automatically tuned to stay centered on the sensor signal of interest even while the sensor is caused to shift form a large static perturbation. In this manner, the filter can continue to perform low level dynamic strain detection, regardless of the static load and thermal state.

In FIG. 6 we have shown the system of FIG. 1 operated as a spectral peak tracker.

In this case, the electrical output 10 from the optical detector is applied to a demodulator 47 and to the input 35 of a tracking controller 33 receiving an input 34 from a dither generator 48 having the configuration of a sinewave signal generator. The tracking controller 33 has the input ports 34 and 35 previously mentioned, and an output port 36. The reference input signal is represented at 37. The output signal 38 from the tracking controller unit 33 is applied to a track control switch 42 and to a low pass filter 45. The switch 42 is connected in turn to one input of an adder or turning junction receiving an input offset voltage 31 for a voltage controlled oscillator 27 when the latter is operated in an open loop configuration, an input signal 37 for representing the reference signal from the sinewave generator 48 and the input signal 30 for the VCO when the latter is operated in a closed loop condition.

The control voltage input to the VCO 27 is represented at 28 and the output from the VCO applied to the filter 7 is shown at 29.

Figure 7A:
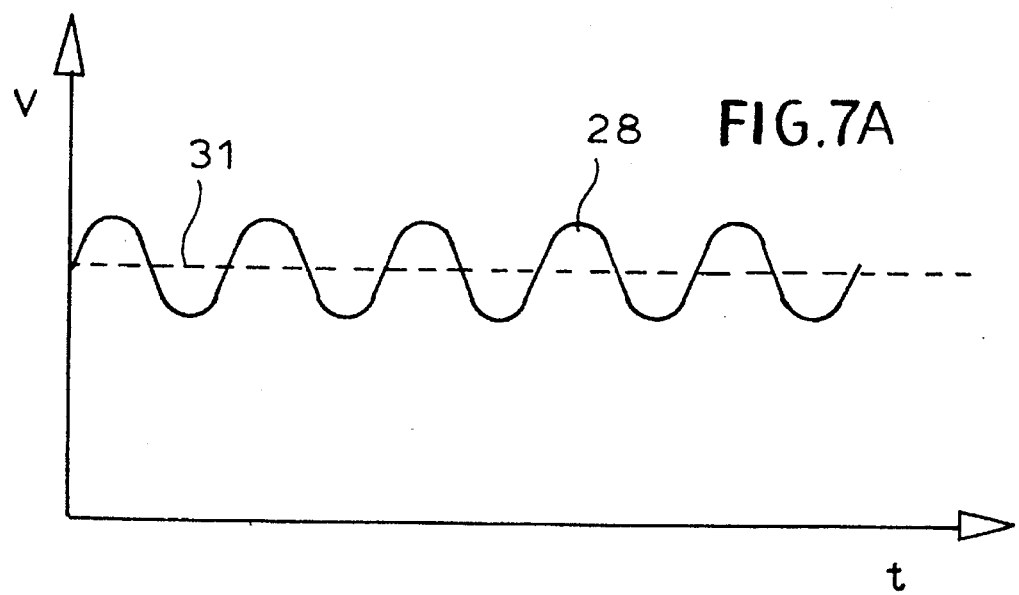
FIGS. 7A, 7B and 7C are graphs of open loop dither signals showing the voltage dither signal from a voltage controlled oscillator (VCO), the corresponding variation of the opto-acoustic tuned filter function in response to the VCO output frequency variation, and the resulting filter output signal, in accordance with the present invention.
Figure 7B:
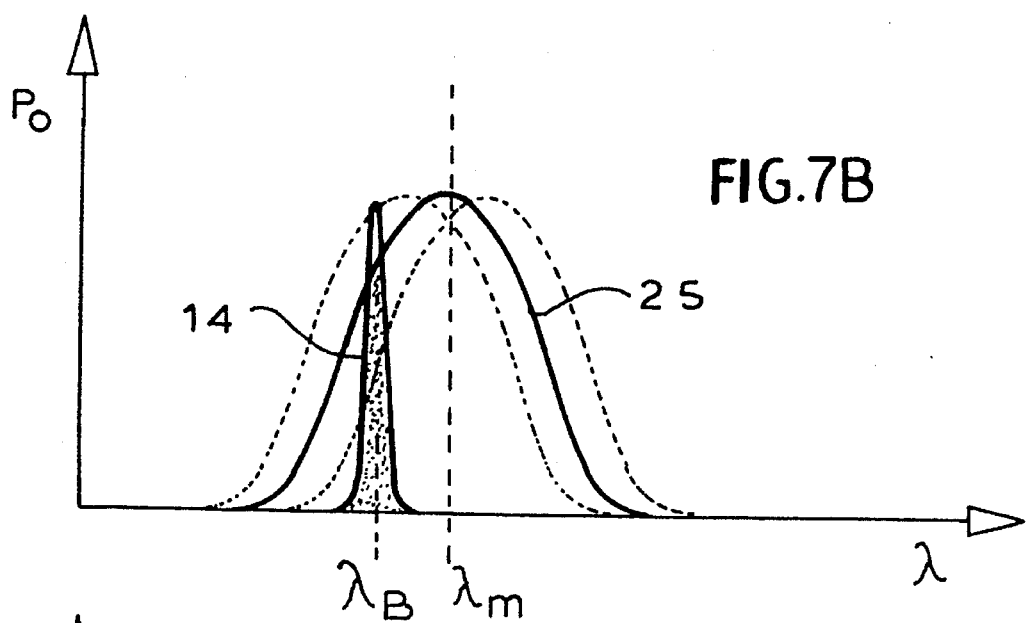
Figure 7C:
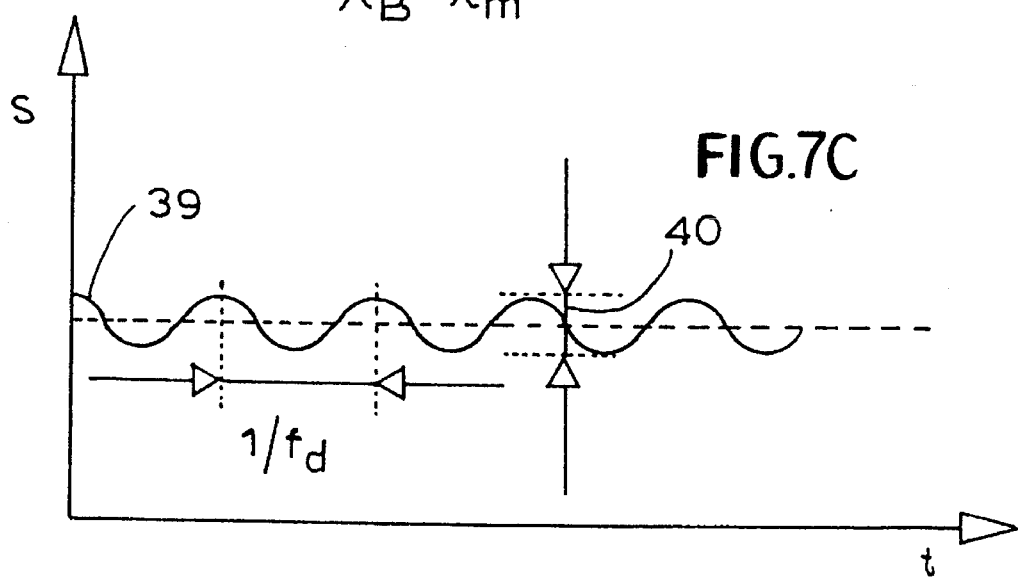

In FIGS. 7A, 7B and 7C to which reference is made below, the signals 28 and 31 are plotted in a graph of voltage versus time, the transmission function 25 and the wavelength distribution of the optical signal reflected by the sensor 24 with its wavelength peak changing as a function of time are plotted on a graph of power versus wavelength and the amplitude 39 of the signal 10 from the optical detector 9 is plotted against time when the sine wave signal 37 generated by the sine wave generator 48 is applied at the VCO input at the open loop condition.

The graphs of FIG. 8 are similar except that at 41 the voltage applied at the VCO input in the closed loop condition (summation of input signals 31, 37 and 38) has been shown at broken lines while the amplitude versus time signal 10 from the optical detector 9 is plotted in the closed loop position at 43.

The signal at frequency f that controls the center wavelength $\lambda_p$ of the transmission function 25 of the opto-acoustic filter 7 is generated by an oscillator 27, i.e. a voltage-controlled oscillator (VCO).

For a fixed, steady-state input voltage 28, the VCO 27 delivers a fixed, steady-state oscillating output voltage 29.

This oscillating signal is used as the carrier signal required to drive the acoustic waveguide contained in the opto-acoustic device 7, hence, the input offset voltage 28 can be varied to change the nominal filter wavelength of the opto-acoustic filter. The input signal 28 at VCO 27 may be changed by summing the steady-state component input offset voltage 31, shown in FIG. 6, a correction control signal 38 coming from the unit control 33 and a sine wave signal with frequency $f_D$ 37 coming from the dither generator 48.

A dither generator frequency signal 37 forces the opto-acoustic device 7 filter function 25 to oscillate periodically round an average value that depends on the signals 38 and 31. In this way a modulation is obtained on the optical signal detected by the detector 9 and hence on the electrical signal 10.

The tracking control unit 33 is typically of an integral lock-in amplifier configuration and has at least two input 34 and 35 ports and one output port 36. One input port 34 is attached to the source of the reference signal 37, usually a pure sine wave. The other input port 35 receives the signal 10 to be analyzed by the tracking controller unit 33.

The function of the tracking controller 33 is to detect the magnitude and phase of a modulation signal imposed on the signal input 10 relative to the input reference sine wave 37. The magnitude and phase of the input signal relative to the reference signal is delivered to the tracking controller unit 33 output port 36 as a signal 38 that is typically in the range of ±1 volt, where +1 volt implies a strong modulation on the input signal 10 that is in phase with the reference signal 37 and −1 volt implies a strong modulation on the input signal 10 that is out of phase with the reference signal 37. This output port signal 38 is the control signal that is connected to the summing junction 32 at the input to the VCO 27 to fine tune the input offset voltage of the VCO.

The utility of the tracking system in this configuration is understood when one observes that the amplitude of the signal 10, determined by the oscillation of the filter function 25 imposed by signal 37 around an average value $\lambda_m$, is proportional to the difference between the wavelength $\lambda_B$ of the radiation 14 reflected from the Bragg sensor 3 and $\lambda_m$.

FIGS. 7A, 7B and 7C illustrate how the dithering opto-acoustic filter function 25 oscillating around an average wavelength $\lambda_m$ generates a modulation in the electrical output signal from the optical detector 9. Note that this is the state of the system when the tracking control switch is in the open loop position.

Figure 8A:
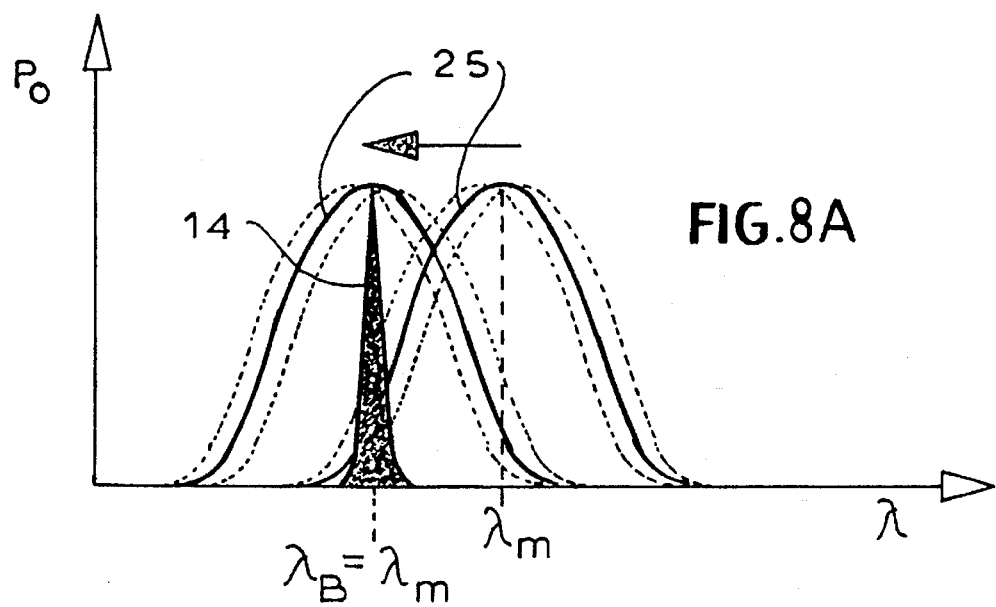
FIGS. 8A, 8B and 8C are graphs of the signals associated with the transition from open loop to closed loop operation showing the opto-acoustic tuned filter function shift from off-peak to peak position on the grating reflectivity profile, and the corresponding VCO drive signal and filter output signals with dither applied, in accordance with the present invention.
Figure 8B:
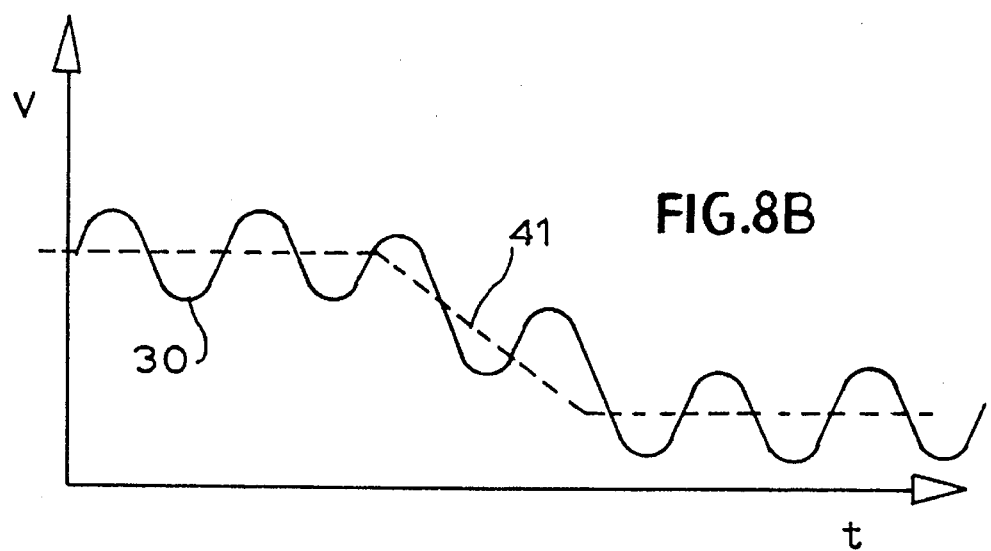
Figure 8C:
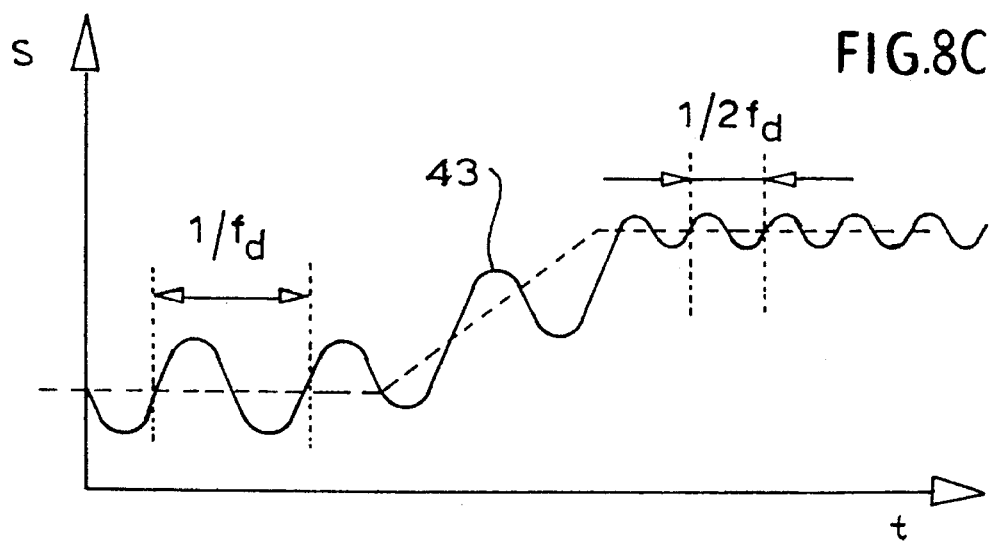

FIGS. 8A, 8B and 8C present the sequence of events that occurs after the tracking control switch 42 is changed to the closed loop position. The tracking unit detects the opto-acoustic filter imposed dither modulation on the optical signal. The optical signal is converted to the electrical input signal for the tracking controller unit by the optical detector. When the tracking unit senses the input modulation signal, it places a voltage at the output port that is proportional to the magnitude and phase of the modulation signal (this represents the displacement and direction of displacement of the average opto-acoustic filter wavelength from the FBG wavelength). This output signal provides a control signal to minimize the in-phase component of the modulation on the input signal when it is connected to the system summing junction 42, and fine tunes the VCO 27 input offset voltage 28 such that the average opto-acoustic filter wavelength $\lambda_m$ is adjusted to match the average fiber Bragg grating sensor wavelength $\lambda_B$. When the opto-acoustic filter 7 responds by centering its average filter 25 wavelength $\lambda_m$ to be coincident with the fiber Bragg grating wavelength $\lambda_B$, the in-phase dither modulation component on the input signal 10 disappears and the opto-acoustic filter 25 remains centered on the fiber Bragg grating sensor 3 wavelength $\lambda_B$. The rate of convergence of this tracking system is usually determined by adjusting the averaging time constant $\tau$ associated with the tracking controller or the open loop gain of the entire tracking system.

It is important to note that in this arrangement, the tracking controller output signal 38 is simply proportional to the displacement of the average wavelength $\lambda_B$ of the opto-acoustic filter 25 with respect to the initial condition. To guarantee a clean signal proportional to the fiber Bragg sensor static strain level, it is desirable to implement low pass filtering by the low pass filter 45 on this signal to remove any residual dither frequency or dither frequency harmonic components that might leak through the system.

After the opto-acoustic filter function 25 has been driven to converge on wavelength $\lambda_B$ of the fiber Bragg grating sensor 3, the dither modulation signal 40 on the signal 37 is minimized at the input to the tracking controller. Likewise, all signals within the bandwidth of the tracking system are minimized at the input to the controller 35. Furthermore, dynamic strain signals at frequencies greater than the tracking controller bandwidth are not compensated, and they appear on the controller input modulated by the dither frequency. Since the controller is converged on the sensor, the dynamic strain signals will appear at the second harmonic of their frequencies.

Figure 9A:
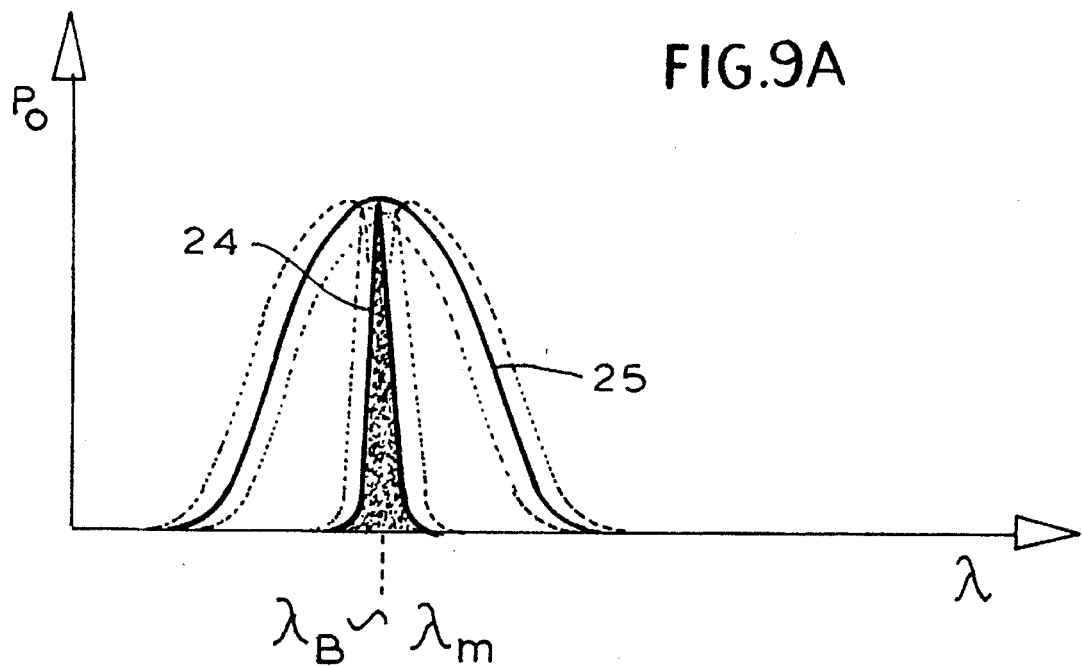
FIGS. 9A and 9B are graphs showing the opto-acoustic tuned filter function, the grating reflectivity and the resultant filter output signal in response to dynamic strain perturbation of the grating while in the closed loop tracking mode, in accordance with the present invention.
Figure 9B:
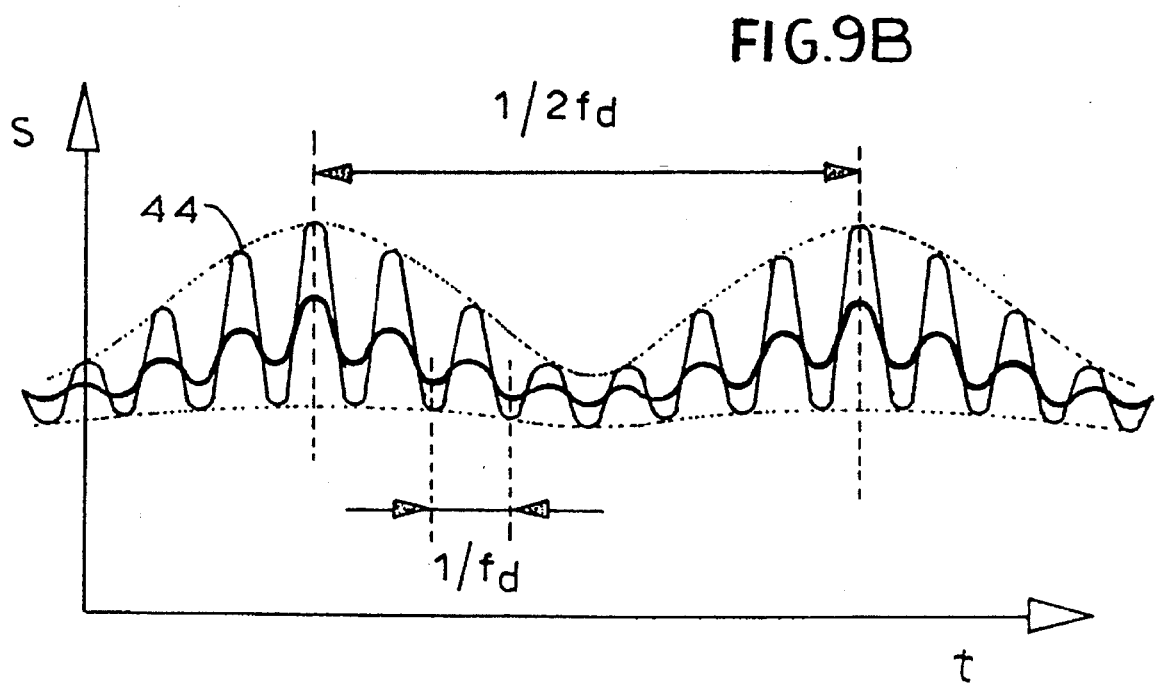

FIGS. 9A and 9B illustrate that dynamic fluctuations in strain that rapidly displace the fiber Bragg grating sensor from its average wavelength are not compensated by the tracking controller whenever their frequency $f_c$ is higher than $1/\tau$. Therefore, the optical detector 9 output will contain a voltage signal modulated 44 at the fundamental $f_D$ of the dither frequency that has a magnitude that is proportional to the dynamic strain level imposed on the fiber Bragg grating sensor 3. A demodulator 47 can be used to rectify the second harmonic component of the dynamic disturbance, to provide a simple voltage proportional to the dynamic strain signal.

FIG. 10 is a preferred implementation of the system architecture of the module, though not the only possible architectural configuration. It is capable of implementing each of the operating modes described previously. This configuration may be extended without any limitation to address the scope and number of sensors 3 required by any of the application fields described above.

In this embodiment, the power supply 50 is connected to a processor 51 which may have a system interface 52. The processor 51 receives the electrical output 10 from the optical detector 9 and provides the control voltage for the VCO 27.

In such an architecture, a processor 51 supplies the control of the wideband optical source 1 through a suitable driver 50. The optical radiation sent out by the source 1 enters the fiber 2 with the sensors 3, that is either embedded or bonded to the structure 4.

The sensors present in the fiber operate within complementary optical wavelength bands, whose summation is not greater than the bandwidth 13 of the source 1. The radiation reflected by the sensors reaches the opto-acoustic analyzer 7 through the fiber coupler 8. The central wavelength of the opto-acoustic filter is controlled by the radio frequency signal generated by the VCO 27, that is controlled in turn by the processor 51. The processor 51 performs the analysis of the signal 10, to provide for the extraction of strain values. Furthermore, it sends all data concerning the status of the system and the status of the interpreted strain signals to the system interface 52. In this form, the architecture of the system is suitable for integration into strain and temperature data acquisition systems required by any of the fields of application described earlier. Of particular interest is the use of the instrument module for the measurement of static and/or dynamic strain in epoxy matrix composite structures.

This configuration is particularly suited to the aeronautical field. For this application, fiber grating sensors 3 are embedded at points where real-time monitoring and measurement of static and dynamic strain is desired during the in-service operation of the structure 4. Referring to the FIG. 11, a number of fiber Bragg grating sensors 3 are embedded between the layers 55 of composite material structure 4. Ends of the optical fiber 2 exit from the surface of the structure 4 at exit points, going through the rubber pad 53 as has been described in Alenia patent application RM 93 A00023.

Figure 12:
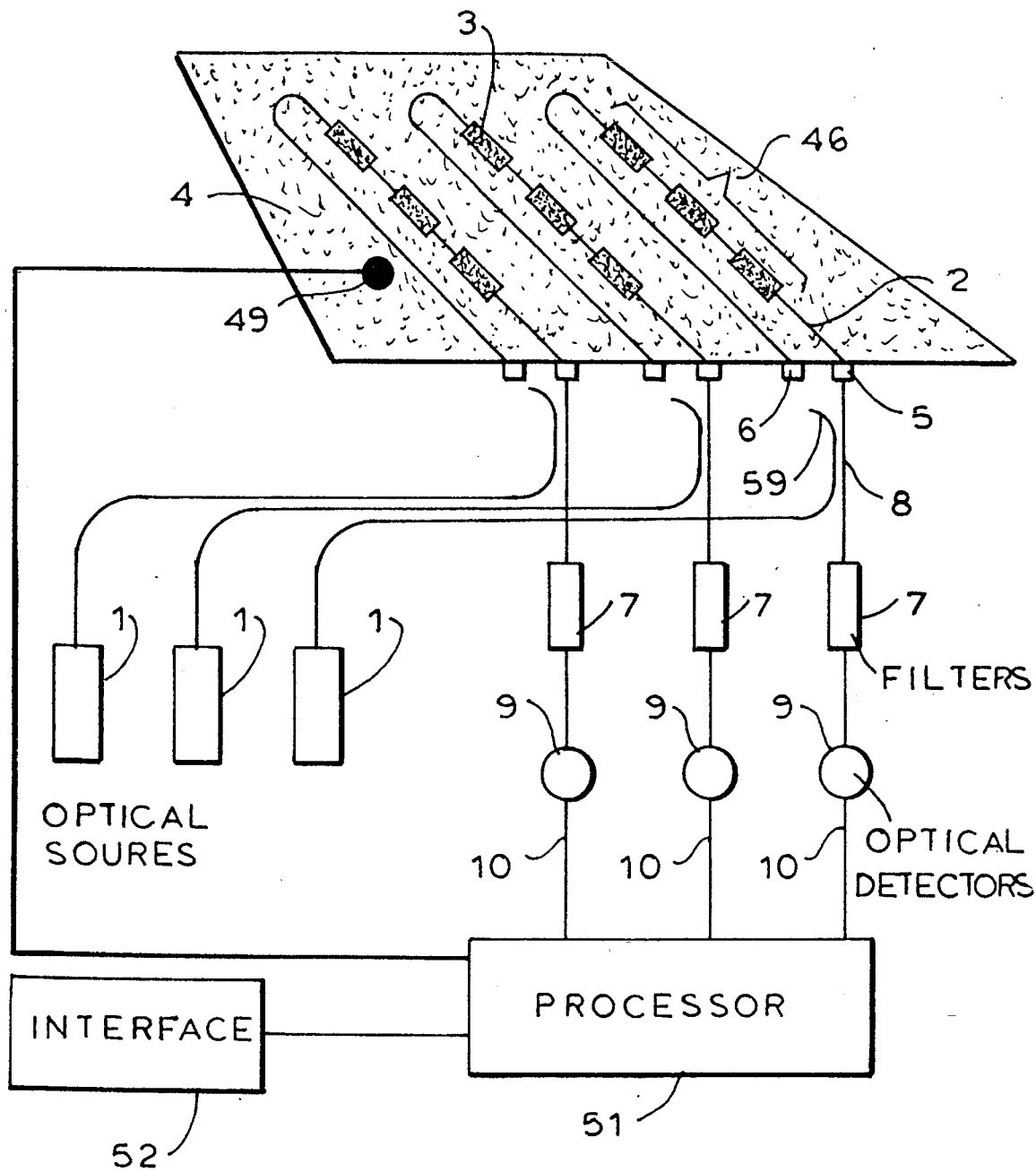
FIG. 12 is a schematic block diagram of a plurality of optical diagnostic instruments and an optical actuator, connected to a controller, in accordance with the present invention.

To indicate one method for expanding the scope of the architecture described in FIG. 10, we use FIG. 12 to show a number of basic modules in an expanded version for the systems of FIG. 1 or FIG. 6. Several strings 46 of optical fiber sensors 3 15 are terminated by the optical connector 56 (FIG. 11). The end of fiber 2 is connected or spliced to the fiber coupler 8, which in turn is connected to the optical source 1 and the opto-acoustic device 7. The coupler port 59 is the backup port that is useful in the event of a failure in the primary coupler exit port 5, (See FIGS. 9A and 9B). Electrical output 10 coming from opto-acoustic device 7 and from the optical detector 9 is sent to the processor 51. It provides for the collection and processing of the data. Processed data are sent to the flight system interface 52. Furthermore the processor 51 can drive, if necessary, one or more actuators 49 (e.g., piezoactuators) embedded in and/or attached to the structure 4. That actuator 49 can for example actively dampen vibrations imposed on the structure 4. The system described in the FIG. 12 shows one possible architecture in which the invention can be arranged to implement control functions for smart structures.

Also, it should be understood that the invention may be used in reflection or transmission. Also, a Fabrey Perot configuration of the gratings may be used if desired to increase sensitivity. Further, other ingress/egress techniques may be used if desired. Also, the fiber may be located on a surface of the structure instead of being embedded therein. Further, the opto-acoustic filter may be driven by a plurality of concurrent surface acoustic waves, thereby allowing for simultaneous filtering of a plurality of gratings having different reflection wavelengths. This would be achieved by using the existing single SAW transducer driven by a plurality of RF signal generators (e.g. VCO's).

We claim:

1. An optical system, comprising:

an optical fiber attached to a structure;

light source means for providing a broadband source light, said source light being launched into said fiber;

at least one fiber sensor formed within said optical fiber, said sensor providing reflected light substantially at a reflection wavelength and providing transmitted light at all wavelengths other than said reflection wavelength, said reflection wavelength varying in response to a perturbation of said structure near where said sensor is attached;

integrated tunable opto-acoustic filter means located in the path of output light from said sensor, for filtering said output light received from said sensor, the passband of said filter means being adjustable to overlap with said reflection wavelength of said sensor in response to a filter control signal, and for providing an optically filtered signal having a power related to the optical transmission of said filter at said reflection wavelength of said sensor;

optical detection means, for detecting the power of said optically filtered signal from said opto-acoustic filter means and for providing a detection signal indicative thereof; and signal processing means responsive to said detection signal, for providing said filter control signal, for detecting a shift in said reflection wavelength due to said perturbation, and for providing a signal indicative of said perturbation said signal processing means comprising means for adjusting said filter control signal for tracking static shifts in said reflection wavelength and for detecting said static shifts and dynamic shifts in said reflection wavelength of said sensor, due to static and dynamic shifts in said perturbation, for a predetermined length of time, and for providing output signals indicative of said static and dynamic shifts in said perturbation.

2. The optical system of claim 1 wherein said signal processing means comprises a plurality of fiber sensors are provided and each of said sensors provides selected light substantially at a respective reflection wavelength and transmitted light at substantially all wavelengths but the respective reflection wavelength and means for adjusting said filter control signal so as to cause sequential scanning of the passband of said filter across said respective reflection wavelengths of each of said sensor.

3. The optical system of claim 2 wherein said signal processing means comprises means for adjusting said filter control signal so as to repeatedly perform said sequential scanning, for detecting static and dynamic shifts in said reflection wavelengths of all said sensors due to static and dynamic shifts in said perturbation and for providing output signals indicative of said static and dynamic shifts in said perturbation.

4. The optical system of claim 2 wherein said signal processing means comprises means for dithering said filter control signal at a predetermined dither frequency and for demodulating said detection signal so as to enhance said tracking function.

5. The optical system of claim 4 wherein said signal processing means comprises means for performing said adjusting, said detecting, and said providing signals, sequentially for each sensor.

6. The optical system of claim 5 wherein said signal processing means comprises means for performing said adjusting, said detecting, and said providing signals, repeatedly at a predetermined repetition rate.

7. The optical system of claim 1 wherein said sensor comprises a Bragg grating.

8. The optical system of claim 1 wherein said output light received by said filter means from said sensor comprises said reflected light from said sensor.

9. An optical system, comprising:

an optical fiber attached to a structure;

light source means for providing a broadband source light, said source light being launched into said fiber;

at least one fiber sensor formed within said optical fiber, said sensor providing reflected light substantially at a reflection wavelength and providing transmitted light at all wavelengths other than said reflection wavelength, said reflection wavelength varying in response to a perturbation of said structure near where said sensor is attached;

integrated tunable opto-acoustic filter means located in the path of output light from said sensor, for filtering said output light received from said sensor, the passband of said filter means being adjustable to overlap with said reflection wavelength of said sensor in response to a filter control signal, and for providing an optically filtered signal having a power related to the optical transmission of said filter at said reflection wavelength of said sensor;

optical detection means, for detecting the power of said optically filtered signal from said opto-acoustic filter means and for providing a detection signal indicative thereof; and signal processing means responsive to said detection signal, for providing said filter control signal, for detecting a shift in said reflection wavelength due to said perturbation, and for providing a signal indicative of said perturbation, said signal processing means comprising means including an optical detector responsive to said filter means for outputting an electrical signal, a tracking controller receiving said electrical signal and a reference input signal, an adder connected to an output of said tracking controller and receiving an input offset voltage, and a voltage-controlled oscillator responsive to an output of said coder for controlling said filter means for adjusting said filter control signal for tracking static shifts in said reflection wavelength and for detecting said static shifts and dynamic shifts in said reflection wavelength of said sensor, due to static and dynamic shifts in said perturbation, for a predetermined length of time, and for providing output signals indicative of said static and dynamic shifts in said perturbation.

* * * * *